United States Patent [19]

Langdon et al.

[11] 4,086,279
[45] Apr. 25, 1978

[54] NONIONIC SURFACTANTS

[75] Inventors: William Keith Langdon, Grosse Ile; Robert Bernard Login, Woodhaven, both of Mich.

[73] Assignee: BASF Wyandotte Corporation, Wyandotte, Mich.

[21] Appl. No.: 720,952

[22] Filed: Sep. 7, 1976

Related U.S. Application Data

[63] Continuation-in-part of Ser. No. 547,788, Feb. 7, 1975, abandoned.

[51] Int. Cl.$^2$ .............................................. C07C 43/02
[52] U.S. Cl. .......................... 260/615 B; 252/DIG. 1; 252/6; 252/13; 252/170; 252/351; 260/458 R; 19/201
[58] Field of Search ...................... 260/615 B

[56] References Cited

U.S. PATENT DOCUMENTS

| | | | |
|---|---|---|---|
| 2,552,529 | 5/1951 | De Groote | 260/615 B X |
| 2,679,520 | 5/1954 | De Groote | 260/615 B X |
| 3,427,248 | 2/1961 | Lamberti et al. | 260/615 B X |
| 3,865,806 | 2/1975 | Knodel | 260/615 B |
| 3,932,532 | 1/1976 | Hunter | 260/615 B X |
| 3,954,882 | 5/1976 | Kalopissij et al. | 260/615 B X |

FOREIGN PATENT DOCUMENTS

| | | | |
|---|---|---|---|
| 2,425,681 | 12/1974 | Germany | 260/615 B |
| 1,087,292 | 10/1967 | United Kingdom | 260/615 B |

*Primary Examiner*—Howard T. Mars
*Attorney, Agent, or Firm*—John W. Linkhauer; Robert E. Dunn; Bernhard R. Swick

[57] ABSTRACT

Nonionic surfactant compositions are made by reacting a 3 to 30-unit polyglycerol as hydrophile with a hydrophobic glycidyl ether in sufficient quantity to substitute 4 to 25% of the hydroxy groups of the polyglycerol. By using glycidyl ethers (which can be made conveniently by reaction of hydrophobic alcohol with epichlorohydrin) it becomes possible to avoid the expense of working with long-chain 1,2-epoxides. The surfactant compositions obtained have solubility and stability in a variety of concentrated ionic solutions, and especially in basic media.

2 Claims, No Drawings

NONIONIC SURFACTANTS

Cross Reference to Related Application

This application is a continuation-in-part of our earlier copending application Ser. No. 547,788, filed Feb. 7, 1975 and now abandoned.

BACKGROUND OF THE INVENTION

1. Field of the Invention

This invention relates to derivatives of polyglycerols having at least three glycerol units which are ethers resulting from the reaction of polyglycerol with a proper proportion of a reactive oxirane-containing hydrophobe compound.

In particular, the reactive oxirane-containing hydrophobe material is a glycidyl ether resulting from the action of epichlorohydrin upon a hydrophobic alcohol. A straight-chain fatty alcohol containing 6 to 20 carbon atoms may be used, or a suitable material may be derived by oxyalkylating a lower alcohol, one that would not itself be hydrophobic, with a sufficient proportion of propylene oxide and/or butylene oxide being used to impart the necessary hydrophobicity.

2. Description of the Prior Art

The preparation of various polyglycerols, by condensing glycerol in the presence of an alkaline catalyst at temperatures such as 100°–300° Centigrade is disclosed in Babayan et al. U.S. Pat. No. 3,637,774. The patent goes on to teach the making of various partial esters or full esters of such polyglycerols for various purposes, such as gelling agents, lubricants, wetting and dispersing agents, etc. The reaction of partial esters with alkylene oxides to form adducts is suggested. Such esters are, however, subject to hydrolysis under alkaline conditions.

The reaction of organic hydroxyl compounds (including polyglycerol) with alkylene oxides is disclosed in Moore U.S. Pat. No. 2,253,723. The patent discloses the use of stannic chloride as catalyst for the reaction of an alkylene oxide with virtually any organic hydroxyl-containing compound. Stannic chloride is completely unsuitable as a catalyst for the making of products in accordance with the present invention. Moreover, the patent does not mention the fatty epoxides which are used as reactants to produce the products of the present invention.

Alkali-stable nonionic surfactant compositions are known which result from the reaction of a fatty alcohol with a lower glycoside, in a manner similar to that described in U.S. Pat. No. 3,547,828 or U.S. Pat. No. 3,772,269. In these patents, neither the hydrophilic group nor the hydrophobic group has any similarity to those used in our composition; furthermore, such compositions differ chemically from those of the present invention, in that the hydrophobe is joined to the hydrophile through an acetal or a hemiacetal linkage, which is not stable in acid media.

U.S. Pat. No. 3,932,532 discloses the making of nonionic surfactants by reacting 1,2-alkylene oxides containing $C_8$ to $C_{20}$ alkyl groups with a particularly purified polyglycerol containing 3 or more glycerol units. Its teachings can be distinguished from those of the present invention both on the ground that the particular purification process set forth in the patent is not necessary and on the ground that the patent does not make it obvious to those skilled in the art that with a glycidyl-ether approach, results substantially as good can be obtained with the use of starting materials which are more readily available and less expensive.

U. S. Pat. No. 3,719,636 teaches making nonionic surfactants by reacting, for example, $C_{12}$ to $C_{14}$ fatty alcohols with several moles of glycidol

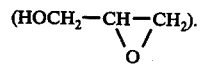

When glycidol condenses, it yields (in effect) glycerol units. Working with glycidol has the drawback that the glycidol is not easy or inexpensive to make and that it is difficult to prevent the glycidol from self-polymerizing.

SUMMARY OF THE INVENTION

A polyglycerol containing at least three glycerol units, and usually five to thirty glycerol units, is reacted in a proper proportion, sufficient to substitute four to twenty-five percent of the hydroxyl groups of the polyglycerol, with a reactive oxirane-containing hydrophobe compound, in particular, a glycidyl ether of a $C_6$ to $C_{20}$ alcohol or a mono-or poly-glycidyl ether derived from a polyoxyalkylene compound prepared from propylene oxide, butylene oxide, ethylene oxide and mixtures thereof. An essential characteristic of this hydrophobe element is that the total hydrophobe alkylene oxide component has an average oxygen/carbon atom ratio of not greater than 0.40. Surfactant compositions result which have solubility and stability in a variety of concentrated ionic solutions, especially in basic media, and are biodegradeable in many instances. The use of the glycidyl-ether approach makes it unnecessary to use fatty epoxides, which are sometimes expensive or not readily available.

DESCRIPTION OF THE PREFERRED EMBODIMENTS

The first step is the preparation of a polyglycerol containing a desired average number of glycerol units may be performed in any suitable manner, as is well known to those skilled in the art. One satisfactory procedure, involving dehydration of glycerol in the presence of an alkaline catalyst at 100 to 300 degrees Centigrade is adequately disclosed in Babayan et al. U.S. Pat. No. 3,636,774, the disclosure of which is hereby incorporated by reference.

The next step is the preparation of the glycidyl ether (or its precursor).

Epichlorohydrin reacts with an alcohol ROH according to the equation

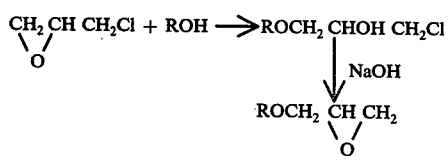

Such preparation is well known to those skilled in the art--see, for example, U.S. Pat. No. 2,314,039. In the foregoing, R may be, for example, an alkyl radical of 6 to 20 carbon atoms. This implies that the surfactants of the invention are made from the corresponding fatty alcohols, rather than from fatty 1,2-epoxides.

Those skilled in the art will also appreciate that it will not always be necessary or desirable to isolate the glycidyl ether

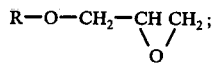

the intermediate monohalohydrin ether

R—O—CH$_2$—CHOH—CH$_2$—Cl will itself in many cases react under basic conditions with the material containing glycerol units to yield an equivalent product.

The glycidyl-ether approach is not limited to the use of fatty alcohols; it is also possible to start with lower alcohols like n-butanol and n-propanol plus propylene oxide, alone or with a suitable minor proportion of ethylene oxide, and make a suitably alkoxylated hydrophobic alcohol, which is then susceptible of being converted by reaction with epichlorohydrin to a corresponding glycidyl ether. In making such materials, a ratio of oxygen atoms to carbon atoms of about 0.4 or lower is observed.

A next step is the reaction of the glycidyl ether (or its precursor) with the polyglycerol. This is preferably done under basic conditions.

It is essential that the hydrophobe material be used in proper proportion in relation to the polyglycerol, such that about 4 to 25 percent of the hydroxyl groups of the polyglycerol are substituted by a reaction with the oxirane-containing hydrophobe. If less than about 4 percent of the hydroxyl groups of the polyglycerol are substituted, there is usually not obtained a sufficiently powerful surfactant effect because the composition remains too hydrophilic. On the other hand, the substitution of more than about 25 percent of the hydroxyl groups of the polyglycerol is generally to be avoided, because this makes the composition more hydrophobic than is ordinarily desirable and because this results in lower solubility of the product composition in water and in alkaline media.

Surfactant compositions of the invention as prepared in their anhydrous form range from viscous liquids to glassy, thermoplastic solids. For handling purposes, they are conveniently diluted with water to form solutions containing 50 to 80 weight percent of solids.

Appropriate conditions of temperature and pressure, as well as the use of proper catalysts, solvents, etc., for the reaction of polyglycerol with the oxirane-containing hydrophobe are critical to the success of this invention, as will be recognized by those skilled in the art. In general, the reaction may be practiced at temperatures ranging from about 100 to 200 degrees Centigrade and at atmospheric pressure.

These surfactant materials have several possible uses. They include use as a surfactant in alkaline bottle-washing compositions, baths for the kier boiling of cotton, alkaline paper-pulp deinking compositions, electrolytic baths for the cleaning of metal parts or for the electrodeposition of metal, foam-type or other industrial alkali cleaning media, and textile-treating formulations. They may be used as a component of shampoos, cosmetics, heavy-duty detergents and other cleaning products. They may be used, moreover, as intermediates for the production of other valuable chemical products; for example, they may be sulfonated to yield anionic surfactants, or polyoxyalkylated to yield other surfactants of a desired hydrophobic-hydrophilic balance and/or molecular weight. In many circumstances, nonionic surfactants according to the invention are incorporated, in amounts sufficient to impart substantial surface-active properties, in aqueous solutions containing 0.1 to 50 weight percent of an alkali-metal hydroxide, such as sodium hydroxide or potassium hydroxide.

In accordance with the invention, the proportions of polyglycerol and the hydrophobe-moiety precursor are such that an average molecule of product nonionic surfactant material of the invention is of the formula

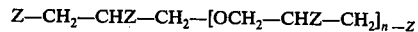

where $n$ is an integer from 2 to 29 and each Z is selected from the group consisting of OH and R and 4 to 25 percent of said Z's are R, where R is selected from the group consisting of (1) —OCH$_2$—CHOH—CH$_2$—OR, where R is selected from the group consisting of (a) a long-chain alkyl group containing 6 to 20 carbon atoms, and (b) a polyoxyalkylene glycol ether radical (CH$_2$—CHR$^2$—O—)$_p$R$^3$, where R$^2$ is selected from the group consisting of hydrogen, methyl and ethyl, $p$ is an integer from 3 to 20, and R$^3$ is an alkyl radical containing 1 to 6 carbon atoms, the average oxygen/carbon atom ratio of the radical (CH$_2$—CHR$^2$—O)$_p$ being not greater than 0.4, and (2) a divalent radical having the structure —O—(—CH$_2$—CHR$^2$—O—)$_q$—CH$_2$—CHOH—CH$_2$—O— in which q is an integer from 6 to 40 and R$^2$ is selected from the group consisting of hydrogen, methyl and ethyl, the average oxygen/carbon atom ratio of the radical (—CH$_2$—CHR$^2$—O)$_q$ being not greater than 0.4, each end of said divalent radical functioning as an R in a molecule of the formula Z—CH$_2$—CHZ—CH$_2$—[-OCH$_2$—CHZ—CH$_2$]$_n$—Z.

The invention described above is illustrated by the following specific examples, in which the parts are by weight unless otherwise specified. The examples are to be interpreted as illustrative and not in a limiting sense.

EXAMPLE I

A mixture of 2-hydroxy-3-chloropropyl ethers of straight-chain C$_{10}$-C$_{12}$ alcohols is prepared and reacted with polyglycerol having an average of five glycerol units in a weight ratio of three parts by weight of polyglycerol per part of the mixture of glycidyl ethers.

To a flask, there are charged 495 grams (3 mols) of a mixture of C$_{10}$ to C$_{12}$ straight-chain alcohols, 1.5 gram of boron trifluoride etherate as catalyst, and 335 grams (3.6 moles) of epichlorohydrin. The material in the flask is provided with a nitrogen blanket and heated over a period of about 2 hours at a temperature of about 56° to 60° C, with the alcohols and catalyst being present in the flask initially and with the epichlorohydrin being charged to the flask during the 2-hour period mentioned above. Materials in the flask are stirred during the two hours and thereafter for an additional two hours, while the material in the flask is permitted to cool to about 33° C. Sodium bicarbonate (3 grams) is charged to the flask, which is then subjected to an absolute pressure of 2 millimeters of mercury and heated over a period of one hour to approximately 103° C, and then permitted to cool. There is thus prepared a product comprising approximately 830 grams of a mixture of 2-hydroxy-3-chloro-propyl ethers of C$_{10}$ to C$_{12}$ alcohols.

The glycidyl-ether precursor product mentioned above is reacted with polyglycerol to obtain a surfactant. To a reaction flask, there are charged 300 grams of a polyglycerol having an average of 5.4 glycerol units, and 43.4 grams of an aqueous solution containing 50 weight percent of sodium hydroxide. Water is removed from the charge by heating it to between 100° and 150° C while subjecting it to a vacuum (200 to 3 millimeters of mercury absolute pressure) over a period of about 2 hours. The reaction flask is then repressurized with nitrogen to atmospheric pressure and, with constant stirring, there are added over a period of about 30 minutes 100 grams of the mixed chlorohydrin-ether product prepared above, while maintaining a temperature on the order of 130 to 165° C.

Tests on the product were conducted as in Example 1. A one weight percent aqueous solution has a pH of 11.10 and remains substantially clear at temperatures of up to 50° C. A Draves sink time of 246 seconds is observed for a 0.1 weight percent aqueous solution, and a surface tension of 28.9 dynes per centimeter.

The Draves sink test, originally described by C. Z. Draves and R. G. Clarkson in volume 20, *American Dyestuff Reporter*, pages 201-208 (1931), has been adopted as Standard Test Method 17-1952, reported in the *Technical Manual* of the *American Association of Textile Chemists and Colorists* (1964).

EXAMPLES 2-9

A polyglycerol is prepared by dehydrating glycerol in the presence of sodium hydroxide as catalyst, obtaining a polyglycerol having an average number of glycerol units per molecule as indicated below in Table No. I, and thereafter, the polyglycerol so produced is reacted, in the proportions indicated in Table No. I, with a material providing a suitable hydrophobic moiety, to produce a surfactant material having the indicated properties. For the sake of completeness, the results of Example 1 are also included in Table I.

TABLE I

Results of Tests of Various Polyglycerol + Hydrophobe Surfactant

| Ex. | GU | Hydrophobe | Ratio | ST | DS | CP | S |
|---|---|---|---|---|---|---|---|
| 1 | 5 | B | 3 | 28.9 | 246 | 50 | Sol. |
| 2 | 10 | A | 3.2 | 28.8 | 65 | >100 | Sol. |
| 3 | 10 | A | 2.3 | 29.7 | 110 | >57 | Sol. |
| 4 | 20 | B | 3 | 28.5 | 126 | 94 | Sol. |
| 5 | 17 | B | 2 | 28.1 | 78 | 63 | >10 |
| 6 | 17 | B | 3 | 29.5 | 110 | 98 | >10 |
| 7 | 17 | B | 3 | 28.8 | 189 | 100 | >10 |
| 8 | 17 | C | 2 | 26.3 | 62 | 30 | >10 |
| 9 | 17 | D | 2 | 27.3 | 75 | 51 | >10 |

GU = average number of glycerol units in polyglycerol
A = glycidyl ether of $C_{10}$ alkanol
B = glycidyl ether of mixture of $C_{10}$-$C_{12}$ alkanols
C = glycidyl ether of straight-chain $C_8$ alkanol
D = glycidyl ether of mixture of straight-chain $C_8$-$C_{10}$ alkanols
Ratio = parts by weight of polyglycerol per part of hydrophobe
ST = Surface tension, dynes per centimeter, 0.1% (wt.) solution
DS = Draves sink time, seconds
CP = cloud point, °C.
S = solubility in 25 wt. percent solution of NaOH
Sol. = soluble, percentage not measured.

The foregoing results demonstrate that various surfactant materials having substantial solubility in alkali may be made, starting with a polyglycerol having an average of 5 to 20 glycerol units per molecule and reacting said polyglycerol with different glycidyl ethers.

EXAMPLE 10

A polyglycerol having an average of 17 units of glycerol per molecule is prepared by dehydrating glycerol. A $C_{18}$ alkanol is reacted first with epichlorohydrin and then with a base, to obtain a glycidyl ether. Then three parts of said polyglycerol are reacted with one part of said glycidyl ether, to obtain a nonionic material having surfactant properties.

EXAMPLE 11

A polyglycerol having an average of 20 glycerol units per molecule is prepared by dehydrating glycerol. A $C_{16}$ alkanol is reacted with propylene oxide in a mole ratio of 1:3 to produce a propoxylated $C_{16}$ alkanol, and then the propoxylated alkanol is reacted, first with epichlorohydrin and then with a base, to obtain a glycidyl ether. Two parts of the polyglycerol are reacted with one part of the glycidyl ether, to obtain a nonionic material having surfactant properties.

EXAMPLE 12

Glycerol is dehydrated to obtain a polyglycerol having an average of 18 glycerol units per molecule. Decyl alcohol is reacted with ethylene oxide in a mole ratio of 1:5, to produce an ethoxylated decanol, and then the ethoxylated decanol is reacted, first with epichlorohydrin and then with a base, to obtain a corresponding glycidyl ether. Then three parts of the polyglycerol are reacted with one part of the glycidyl ether to obtain a nonionic material having surfactant properties.

EXAMPLE 13

Glycerol is dehydrated to obtain a polyglycerol having an average of ten glycerol units per molecule. A $C_{20}$ alkanol is reacted with propylene oxide in a mole ratio of 1:5, to obtain a propoxylated $C_{20}$ alkanol, and then the propoxylated $C_{20}$ alkanol is reacted first with epichlorohydrin and then with a base, to obtain a glycidyl ether. Two parts of the polyglycerol are reacted with one part of the glycidyl ether, to obtain a nonionic material having surfactant properties.

EXAMPLE 14

A surfactant is made by reacting a 17-unit polyglycerol with a monochlorohydrin ether of an oxypropylated n-butanol having a molecular weight of approximately 464 (n-butanol plus about 7 oxypropylene units). The product thus corresponds to the case, within the general formula indicated hereinabove, where Z = —OCH$_2$—CHOH—CH$_2$—O—R$^3$, and R$^3$ is a polyoxyalkylene glycol ether radical —O—(CH$^5$—CHR$^5$—O)$_p$R$^6$, where R$^5$ is methyl, p = 7, and R$^6$ is n-butyl, and the percentage of the Z's that are R is 5.5 percent.

To a 500-milliliter flask there are charged 200 grams of 17-unit polyglycerol, and after warming to 90° C at atmospheric pressure under a blanket of nitrogen, there are added 30 grams of a 50 weight percent aqueous solution of sodium hydroxide. Then the materials in the flask are subjected to stripping conditions (temperature 110° to 155° C and absolute pressure of 400 to 10 millimeters of mercury) for 25 minutes to remove water. The reactor is repressurized with nitrogen to atmospheric pressure, and then there are added dropwise over a period of 1 hour and 25 minutes 100 grams of a glycerol α-monochlorohydrin ether of a 7-unit-oxypropylated n-butanol, the temperature being maintained during the addition at approximately 140° C. The reaction is permitted to continue for two hours, after which the reactor is permitted to cool, yielding 309.5 grams of a tan paste product.

The product gives, in an aqueous solution containing 0.1 weight percent, a Draves sink time (3-gram hook) of 102.6 seconds and a surface tension of 29.7 dynes per centimeter. A 1 weight percent aqueous solution is milky at temperatures greater than 25° C, and has a pH of 11.45. In dynamic foam height tests, no foaming is observed, either at 49° or at 25° C. The dynamic foam height test is disclosed in an article by H. E. Reich et al. in the Apr. 1961 issue of *Soap and Chemical Specialties*, volume 37, page 55.

EXAMPLE 15

Example 14 is repeated, except that there is used a different monochlorohydrin ether of somewhat greater molecular weight, namely one based upon n-butanol oxypropylated to an average molecular weight of 673 (approximately 10 oxypropyl units). There is obtained a tan paste product weighing 310 grams.

The product gives, in aqueous solution containing 0.1 weight percent, a Draves sink time (3-gram hook) of 197.1 seconds and a surface tension of 30.8 dynes per centimeter. A 1 weight percent aqueous solution is milky at temperatures greater than 25° C, and has a pH of 11.68.

EXAMPLE 16

Distilled n-octyl glycidyl ether is reacted with a 9.4-unit polyglycerol on a 1:1 weight ratio, yielding a non-ionic surfactant.

To a four-necked flask of 500-ml. capacity there are charged 100 grams of a 9.4-unit polyglycerol and 1 gram of a 50 weight percent aqueous solution of sodium hydroxide, and the contents of the flask are then stripped for 10 minutes at 120°–130° C and 25–10 mm. of mercury absolute pressure. The vacuum is then released to atmospheric pressure by the admission of nitrogen, and then, with the material in the reaction flask at about 140° Centigrade, there are gradually added over 12 minutes 100 grams of a purified glycidyl ether of n-octanol. At the conclusion of the addition of the glycidyl ether, the cloudiness of the reaction mixture suddenly disappears, leaving a clear light-amber liquid, with an accompanying rise in pot temperature up to 170° C, owing to heat of reaction. The reaction is continued for one hour at 153° to 146° C under a blanket of atmospheric-pressure nitrogen, and thereafter 50 grams of distilled water are added to obtain a clear, medium-amber product in the form of an 80 weight percent solution. Further dilution yields a 0.1 weight percent solution having a Draves sink time (3-gram hook) of 38.2 seconds and a surface tension of 28.0 dynes per centimeter.

EXAMPLE 17

Example 16 is repeated, except that in place of distilled n-octyl glycidyl ether, there is used a glycidyl ether based upon a mixture of $C_8$ to $C_{10}$ alkanols. Again there is obtained a medium-amber solution containing 80 weight percent of solids. Further dilution yields a 0.1 weight percent solution having a Draves sink time (3-gram hook) of 56.4 seconds and a surface tension of 29.3 dynes per centimeter. A 1 weight percent aqueous solution is milky and has a pH of 10.0.

While we have shown and described herein certain embodiments of our invention, we intend to cover as well any change or modification therein which may be made without departing from its spirit and scope.

We claim:

1. A nonionic surfactant material of the formula

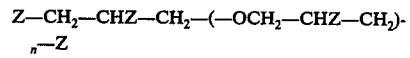

where $n$ is an integer from 2 to 29 and each Z is selected from the group consisting of OH and R and 4 to 25 percent of said Z's are R, where R is selected from the groups consisting of
   (1) $-OCH_2-CHOH-CH_2-OR^1$, where $R^1$ is selected from the group consisting of
      (a) the long-chain alkyl groups containing 6 to 20 carbon atoms, and
      (b) the polyoxyalkylene glycol ether radicals of the formula $(CH_2\text{-}CHR^2-O-)_p-R^3$, where $R^2$ is selected from the group consisting of hydrogen, methyl and ethyl, $p$ is an integer of from 3 to 20, and $R^3$ is selected from the group consisting of alkyl radicals containing 1 to 6 carbon atoms, the average oxygen/carbon atom ratio of the radical $(CH_2-CHR^2-O)_p$ being not greater than 0.4, and
   (2) a divalent radical having the structure $-O-(-CH_2-CHR^2-O-)_q-CH_2-CHOH-CH_2-O-$ in which $q$ is an integer from 6 to 40 and $R^2$ is selected from the group consisting of hydrogen, methyl and ethyl, the average oxygen/carbon atom ratio of the radical $(-CH_2-CHR^2-O)_q$ being not greater than 0.4, each end of said divalent radical functioning as an R in a molecule of the formula $Z-CH_2-CHZ-CH_2-[OCH_2-CHZ-CH_2]_n-Z$.

2. A material according to claim 1, wherein $R^1$ is a polyoxyalkylene glycol ether radical of the formula

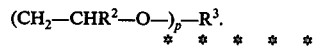

* * * * *